Figure 1:
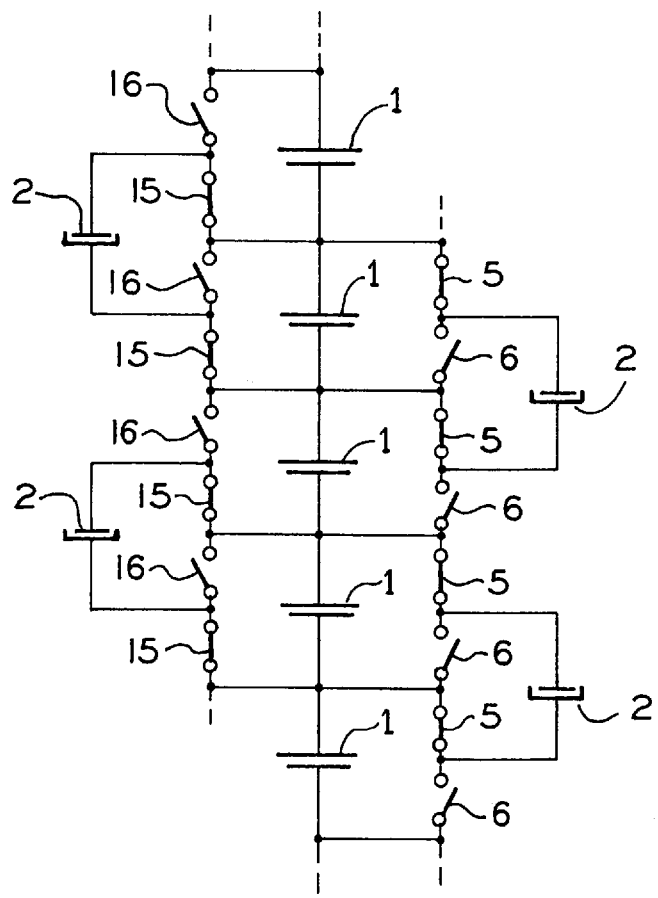

United States Patent [19]

Schmidt

[11] Patent Number: 5,814,970
[45] Date of Patent: Sep. 29, 1998

[54] APPARATUS FOR CHARGE EXCHANGE AMONG A PLURALITY OF SERIES CONNECTED ENERGY ACCUMULATORS OR ENERGY CONVERTERS

[75] Inventor: Heribert Schmidt, Emmendingen, Germany

[73] Assignee: Fraunhofer-Gesellschaft Zur Forderung der Angewandten Forschung e.V., Munchen, Germany

[21] Appl. No.: 793,088
[22] PCT Filed: Jun. 13, 1995
[86] PCT No.: PCT/DE95/00791
 § 371 Date: Jan. 29, 1997
 § 102(e) Date: Jan. 29, 1997
[87] PCT Pub. No.: WO96/04564
 PCT Pub. Date: Feb. 15, 1996

[30] Foreign Application Priority Data

Jul. 30, 1994 [DE] Germany ............................ P4427077.1

[51] Int. Cl.$^6$ .................................................. H01M 10/46
[52] U.S. Cl. ............................ 320/118; 320/119; 320/122
[58] Field of Search ............................ 320/1, 6, 16, 17, 320/18, 65, 103, 116, 117, 118, 119, 120, 122, 166; 323/316

[56] References Cited

U.S. PATENT DOCUMENTS

| 4,331,911 | 5/1982 | Park ........................................... 320/14 |
| 5,177,425 | 1/1993 | Goto ............................................ 320/6 |
| 5,592,067 | 1/1997 | Peter et al. ................................. 320/15 |
| 5,631,534 | 5/1997 | Lewis ........................................... 320/6 |

FOREIGN PATENT DOCUMENTS

| 432 639 | 6/1991 | European Pat. Off. . |
| 20 21 531 | 12/1971 | Germany . |
| 39 40 929 | 5/1991 | Germany . |
| 10 65 959 | 1/1984 | U.S.S.R. . |

OTHER PUBLICATIONS

Heribert Schmidt et al., "The Charge Equalizer–A New System to Extend Battery Lifetime In Photovoltaic Systems, U.P.S. and Electric Vehicles," 15th INTELEC Conference, Paris, France, 1993, pp. 146–151, Sep. 1993.

"Switched Capacitor System for Automatic Series Battery Equalization" by Cesar pascual and Philip T. Krein, APEC '97 Twelfth Annual Applied Power Electronics Conference and Exposition, vol. 2, pp. 848–854.

*Primary Examiner*—Edward Tso
*Attorney, Agent, or Firm*—Baker & Daniels

[57] ABSTRACT

A method and apparatus for allowing charge exchange among a plurality of energy accumulators of the same type which are interconnected in series. At least one electric accumulator is cyclically and alternatively connected in parallel to the energy accumulators. Each electric accumulator consists of a capacitive element charged by the energy accumulators. The electric accumulators are also each cyclically connected in parallel to one of the energy accumulators, so that during each phase of the cycle al energy accumulators of the same type are individually connected in parallel to an electric accumulator thereby establishing a direct power flow from higher voltage accumulators to lower voltage accumulators. The method and apparatus may be used for equalizing the charge of energy accumulators, and energy converters.

3 Claims, 2 Drawing Sheets

FIG_1

APPARATUS FOR CHARGE EXCHANGE AMONG A PLURALITY OF SERIES CONNECTED ENERGY ACCUMULATORS OR ENERGY CONVERTERS

The invention relates to an apparatus for charge exchange among a plurality of like energy accumulators or energy converters wired in series and forming an overall energy accumulator, in which apparatus electric accumulators consisting each of a capacitive element charged from the energy accumulators are with the aid of switches that are activated by a clock generator wired in parallel with one each of the like energy accumulators or energy converters, so that all of the like energy accumulators or energy converters are in at least one cycle wired, each individually, in parallel with a capacitive element.

Such an apparatus is known from the document DE 39 40 929 of the applicant. On that apparatus, two energy accumulators each, of the plurality of energy accumulators, are with the aid of a power multiplexer connected to a capacitor, whereby a charge equalization can take place between the two selected energy accumulators. Disadvantageous is here that always only two energy accumulators can be processed, each of the connected accumulators being connected to the equalizing capacitor less than 50 percent of the total time. In an incidental selection of the energy accumulator, each energy accumulator is with N energy accumulators thus connected to the capacitor for charge equalization only for 1/(2×N)th of the time. Improving this system requires an expensive wiring logic. The switches in the prior apparatus must be configured for the entire system voltage.

A similar monitoring method is known from the U.S. Pat. No. 4 331 911 and serves to balance voltages of individual series-wired accumulators, using a DC-DC converter. The electric accumulators are transformer elements. The sole central converter for all accumulators is energized from the overall battery and is incapable of detecting peculiarities of individual accumulators that occur due to ageing.

The document DE-OS 20 21 531 describes an apparatus for extending the discharge time of rechargeable accumulators, where occurring induction currents are by incorporation of a coil in a DC circuit returned again to the current source by way of a capacitor. An extension of the discharge time of the accumulators is effected in that the load is connected to the accumulators at a pulse duty factor that is configured smaller than one. An extension of the service life of accumulators in view of their replacement is not achievable thereby. Specifically, accumulators degrading in their quality cannot be recognized.

Until such an accumulator degrading in its storage and charging quality is recognized by the monitoring system for accumulators, its faulty performance leads to a chain of reactions in the group of accumulators, leading to a degradation of also the other accumulators.

The document DE-PS 30 31 931 describes an apparatus for extending the discharge time of rechargeable accumulators where the voltage states of the accumulators are detected with a monitoring system. An extended, operationally reliable discharge of the accumulators is effected in that the accumulator operation is not ended at discharge, and thus upon reaching a limit voltage of the weakest cell, but only when this limit voltage is reached at the average of all interconnected accumulators. An extension of the service life of accumulators in view of their replacement is not achievable thereby.

Known from SU 1 065 959 is an apparatus for an accumulator charger, which apparatus prevents overcharging and charging at inverted polarity of accumulators. The charging current is monitored by a transistor circuit which additionally comprises zener diodes. This safety circuit, however, can guarantee neither a monitoring of the quality of the accumulators nor bring about a longer service life of accumulators degrading in their quality.

Known from EP 90 123 409 of the applicant is a monitoring system for a plurality of series-wired like accumulators where with the aid of a control circuit an electric accumulator is connected in parallel with one of the accumulators, wherein the primary winding of a transformer, in series with a breaker connected to the control circuit, is connected in parallel to the poles of the group of accumulators. The electric accumulator is formed always of the secondary winding, which always connects via a blocking diode to each accumulator. As a difference signal occurs between the accumulators, a function generator in the control circuit is activated via a comparator circuit, the output of which function generator is connected to the breaker. This makes it possible to supply energy to exactly the weakest accumulator. For small applications, this system has the disadvantage of a plurality of control components, which represent a cost factor and, as the case may be, a space and weight factor. Besides the appreciable expense for selecting the respective weak or strong cell, the performance range of the blocking converters used is upwardly limited.

Basing on this prior art, the objective underlying the invention is to provide a method of the initially mentioned type where the replacement of an accumulator degraded in its quality can be delayed at a wiring expense lower than with the prior art.

This objective is for an apparatus according to the preamble of claim 1 met according to the invention in that to each capacitive element there are two switches each assigned on each of its pole taps; these switches are alternately opened and closed by the clock generator at the mentioned timing, whereby the two switches provided on each pole tap of the capacitive element are connected each with the two poles of one of the energy accumulators or energy converters. Each tap is thus switched alternately to the two poles of a coordinated energy accumulator or energy converter, so that substantially all like energy accumulators or energy converters are in each timing step switched individually in parallel with a capacity element.

This results in a virtual parallel wiring of pairs of storage means, cells or accumulators actually wired in series, so that upon occurrence of voltage differences between individual cells an equalizing current flows between the cells automatically and without any further selection of the cells or the control. As a result, the deviations of cell voltages among one another become zero in the ideal case, whereas the prior art according to U.S. Pat. No. 4,331,911 selects the ratio of transformation of the transformer used, in order to avoid the flow of currents in the circuit, exactly such that the voltages induced on the secondary side are always somewhat lower than the average battery voltage. Due to the blocking effect of the diodes, only a distinct voltage difference between a fictitious average cell and the qualitatively degraded cell can thus lead to a flow of current in the respective cell.

In the apparatus proposed here, the energy is not drawn from the overall battery or overall arrangement, but a direct flow of current from any cell of higher voltage to adjacent cells with lower voltage is possible by the coupling of pairs of accumulators and by synchronous switching.

Further embodiments of the invention are characterized in the subclaims.

Figure 2:
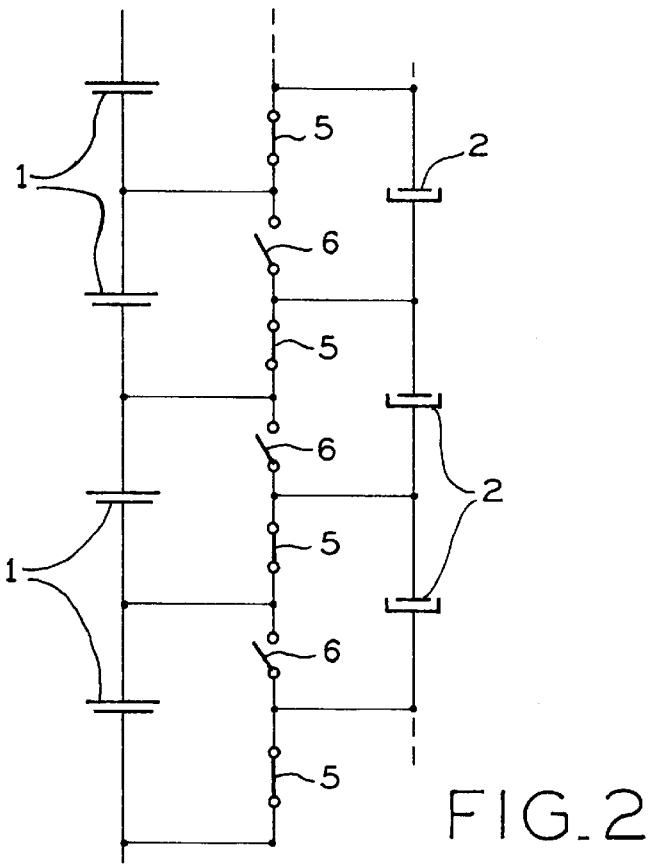
Figure 3:
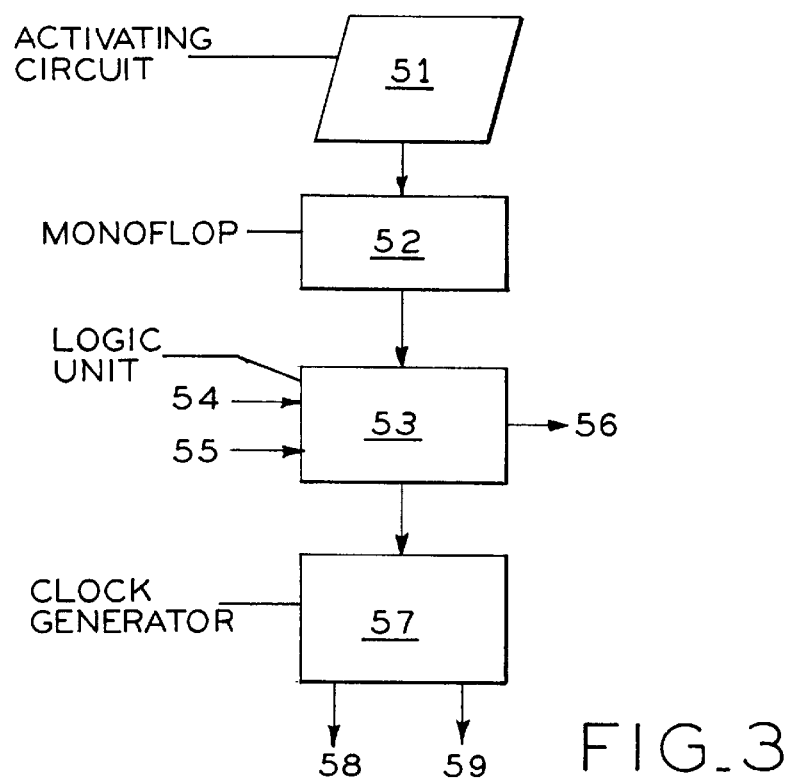

Two exemplary embodiments of the invention are more fully explained hereafter with the aid of the drawing, which shows in:

FIG. 1, a section of a wiring diagram of an apparatus for charge equalization, for five accumulators illustrated in this section, according to a first exemplary embodiment;

FIG. 2, a section of a wiring diagram of a further apparatus for charge equalization, for four accumulators illustrated in this section, according to a second exemplary embodiment; and FIG. 3, a block diagram of a sequence control for an apparatus for charge equalization according to one of the exemplary embodiments.

Possible, of course, are a plurality of realization options of circuits for the application of the method, of which two are illustrated hereafter.

FIG. 1 shows a section of a wiring diagram of an apparatus for charge equalization, for five accumulators 1 illustrated in the section, according to a first exemplary embodiment. These may form a single group of five accumulators 1 or, as indicated by dashed lines, parts of a larger battery bank comprising, e.g., 10 to 12 accumulators 1. Besides accumulators 1 as energy storages, the apparatus can be used also for energy converters such as fuel cells or for other energy-storing systems where the performance of a single energy storage or energy converter has a great influence on the overall system.

Provided as electric storages are four capacitors 2, each being assigned to two accumulators 1. Besides capacitors 2, also electrochemical storages or other capacitively working storages of electric energy may be used.

The capacitors 2 are now connected alternately, with the aid of two pairs of switches 5 and 6 respectively 15 and 16, at a pulse-duty factor of less than 50 percent to the poles of the one or other pertaining accumulator 1, respectively. The switches 5, 6, 15, 16 are illustrated at the time step in which the switches 5 and 15 are closed and the switches 6 and 16 are open, so that each capacitor 2 is connected to the accumulator 1 situated farther up on the drawing. In the next, not illustrated timing step, the switches 6 and 16 close then, whereas the switches 5 and 15 are open, so that each capacitor 2 is then wired in parallel with the other coordinated accumulator 1.

The switches 5 and 6, respectively 15 and 16, are connected each to the appropriate outputs of two clock generators, not illustrated in the drawing, which are able to generate a clock frequency of several 100 Hz up to several 10 kHz. A correlation between the clock frequencies and timing starts of the two clock generators does not necessarily exist. The state illustrated in FIG. 1, in which the switches 5 and 15, respectively 6 and 16, are closed or open in synchronism, is not a technical necessity. Moreover, it is possible to time the capacitors 2 disposed on one side of the illustration in FIG. 1 differently, provided that only the four switches 5 and 6 assigned to a capacitor 2, respectively the four switches 15 and 16, are switched in synchronism, so that a capacitor 2 is at any instant wired in parallel always with maximally one accumulator 1.

By switching always one capacitor 2 in parallel with one of the accumulators 1 assigned to it, said accumulator accepts charge or dispenses it until the capacitor 2 carries the same voltage as accumulator 1. If an accumulator 1 now carries a lower voltage on account of ageing or other influences, an appropriate current flows directly to this cell.

As the switches 5 and 6, respectively 15 and 16, switch over, the capacitor 2 is separated from the accumulator 1 connected so far, and is switched in parallel with the second accumulator 1 coordinated with it. Here, an equalizing current flows again, depending on the state of charge of capacitor 2 and accumulator 1.

The wiring principle of FIG. 1 requires N−1 capacitors 2 and 4×(N−1) switches 5, 6, 15 and 16 for N accumulators 1. In the illustrated exemplary embodiment, two adjacent accumulators 1 each are assigned to a capacitor 2. This is not a necessity; it suffices to coordinate with one each capacitor 2 two accumulators 1, provided only that with each accumulator 1, except for a few accumulators 1 disposed at the ends of the circuit, two different capacitors 2 each are switched in parallel in different timing steps.

In a straight interconnection of several battery banks according to FIG. 1, only the accumulators 1 of each bank equalize their voltage then among one another. To equalize the individual accumulator voltages of all accumulators 1 of the entire interconnected battery bank it is then necessary to connect one, preferably the first or last accumulator 1 wired to only one capacitor 2 via an additional capacitor 2 and further switch pairs 5 and 6 to the last, respectively first, accumulator 1 of the further battery bank. Overall, the advantage of an apparatus relative to FIG. 1 is that no selection logic is required, that all accumulators 1 or fuel cells, except for the two outermost ones of each battery bank, are on average connected to a capacitor nearly 100 percent of the time and that even the terminal cells still are connected to a capacitor for 50 percent of the operating time. Each switch carries maximally the voltage of an accumulator which, as compared to the overall voltage of a battery bank, is considerably lower, allowing the use of more low-cost transistor circuits.

Since nearly all accumulators 1 are utilized for charge equalization during the entire operating time of the apparatus and fewer transistors are used in the power circuit, the effectivity of the apparatus increases over the prior art.

The apparatus according to FIG. 1 allows an asynchronous connection of the capacitors, and thus a simpler cascading of the circuit.

FIG. 2 shows a section of a wiring diagram of a further apparatus for charge equalization for the four accumulators 1 illustrated in this section, according to a second exemplary embodiment. Identical features are referenced identically in all of the figures. The wiring according to FIG. 2 concerns an exemplary embodiment with a reduced wiring expense as compared to FIG. 1. As can be seen easily, this wiring requires N−1 capacitors 2 for N accumulators 1, but only 2×N switches 5 and 6.

In this wiring, the capacitors 2 are in the two timing steps connected, in phase, each to an accumulator 1. But since the switches 5 and 6 are intended each for the parallel wiring of two capacitors 2, a synchronous activation of all switches 5 and 6 is necessary in this exemplary embodiment.

FIG. 3 shows a block diagram of a sequence control for an apparatus for charge equalization according to one of the exemplary embodiments. An activating circuit 51 is provided here, which can be triggered by a plurality of events, depending on application. This may be a straight manual on-off switch formed, e.g., in a battery-powered vehicle, by the equivalent of an ignition lock.

The circuit may also comprise a voltage comparator that passes a switching pulse to the output of the circuit when the absolute value of the battery voltage ranges within, or better without, preset values. With a lead accumulator 1, e.g., these could range at a voltage higher than 2.2. volts or lower than 1.95 volts. A voltage of an accumulator 1 outside these values allows to conclude a charging or discharging operation at which charge equalization should take place.

Provided also could be a detector recognizing a dynamics of the battery voltage that is indicative of quick load changes, such as occurring in the operation of an electric vehicle. Moreover, also the deviation of the voltage of individual accumulators 1 from the momentary average of the overall system could be utilized as a trigger for the activating circuit 51. Lastly, the circuit may also start for charge equalization, e.g., periodically, for example every three hours.

When the activating circuit 51 generates a start pulse according to one of the above conditions, which may be tested individually or several at a time, said pulse activates, e.g., a monoflop 52 which turns the apparatus on for charge exchange for a predetermined time, e.g., for one-half hour, or this time is determined by a characteristic of the activated load. The apparatus is monitored by a logic unit 53 to which further signals 54 and 55 are passed for detection of an overload or excess temperature of components such as transistors. Such circuits 53 may feature also an output 56 for display of status or control signals, for example, for load dumping. This logic unit 53 activates the clock generator 57, to the outputs 58 and 59 of which the control inputs of the switches 5 and 6, respectively 15 and 16, are connected.

I claim:

1. An apparatus for effecting an exchange of electric charge between a plurality of like, series connected, energy accumulators which define an overall energy accumulator, said apparatus comprising:

a plurality of series connected energy accumulators;

a plurality of electric storage elements, each said storage element comprising an element which is capacitively charged from said energy accumulators;

a plurality of switches for respectively connecting one of said energy accumulators in parallel with one of said electric storage elements;

a clock for defining alternate time periods for alternately opening and closing said plurality of switches, whereby two adjacent said energy accumulators are alternately connected in parallel with one of said electric storage elements in said time periods.

2. The apparatus according to claim 1, wherein said plurality of electric storage elements are connected in series.

3. The apparatus according to claim 1 further comprising a sequence control circuit and an activating means for activating said sequence control circuit for one of a predetermined period of time and a period of time determined by a connected load.

* * * * *